UNITED STATES PATENT OFFICE.

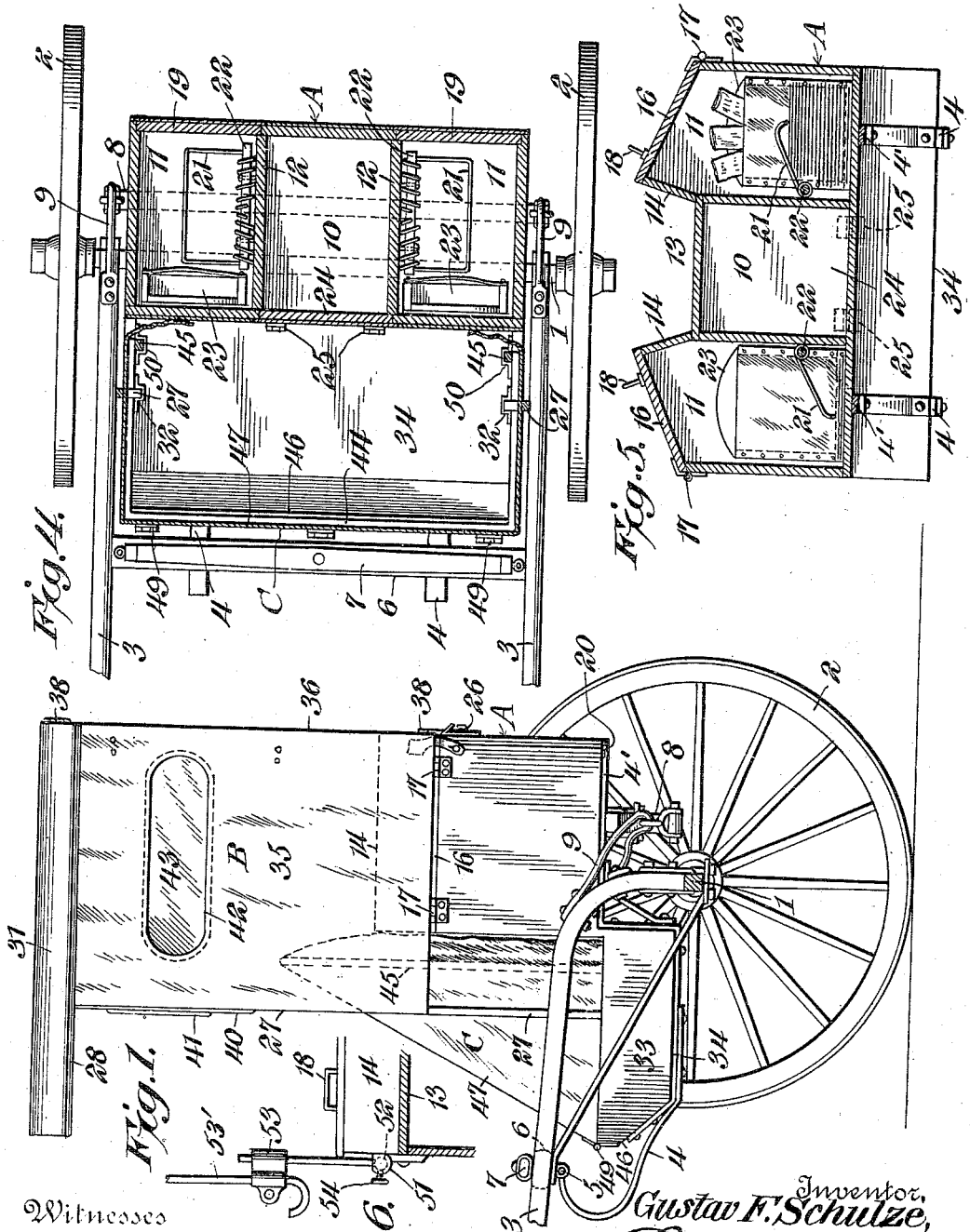

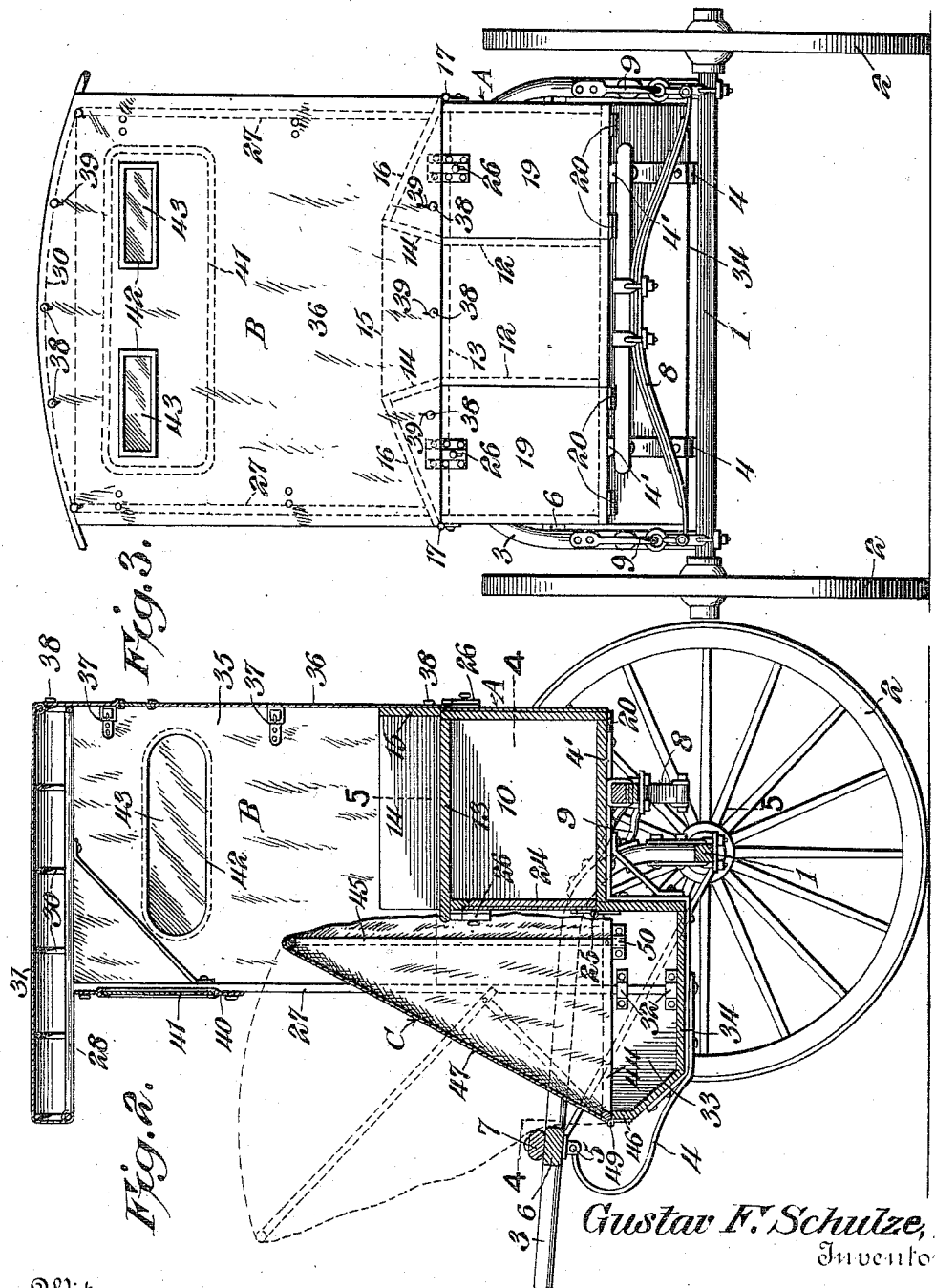

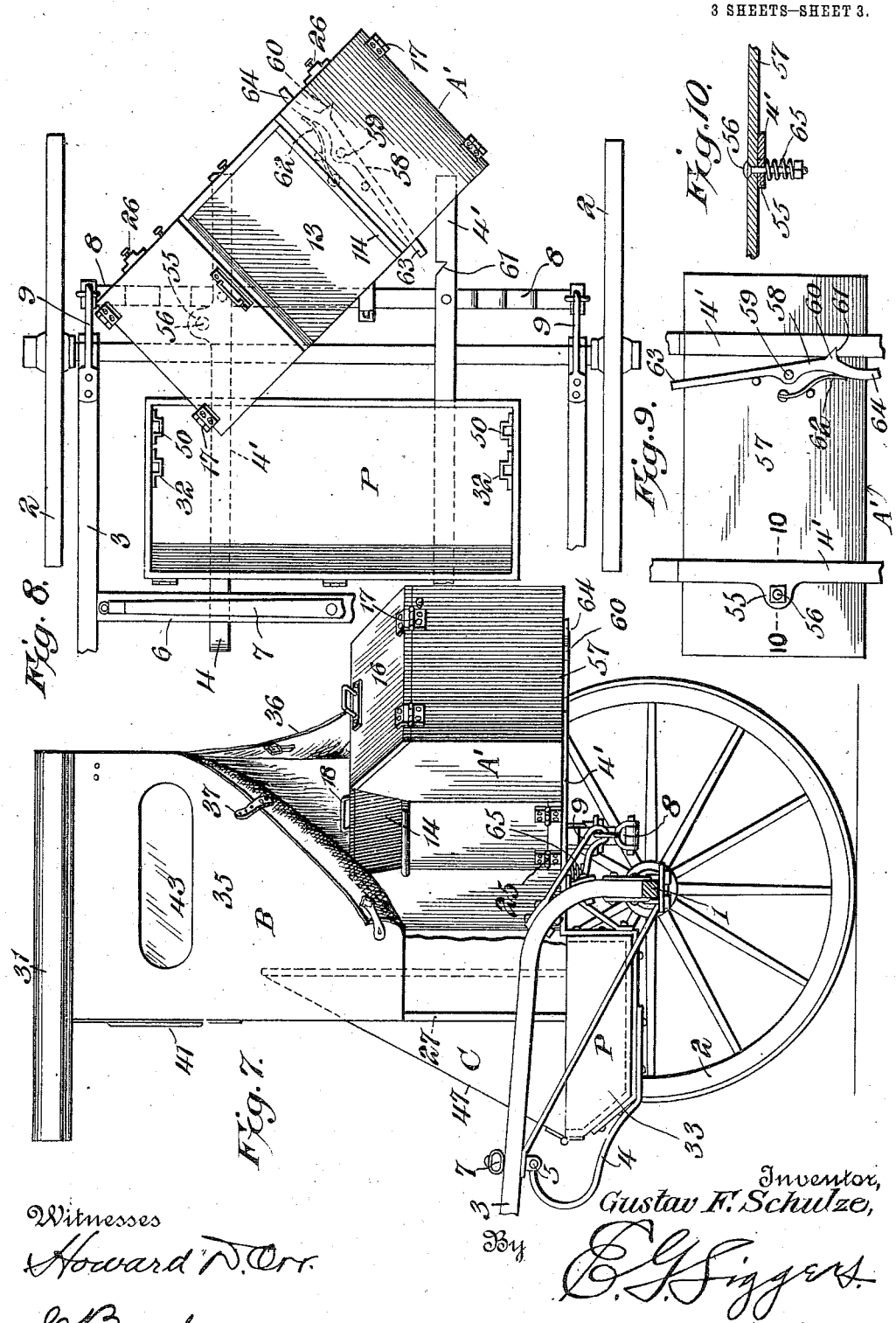

GUSTAV F. SCHULZE, OF VANDALIA, MISSOURI.

POSTMAN'S DELIVERY-WAGON.

973,390.  Specification of Letters Patent.  Patented Oct. 18, 1910.

Application filed May 12, 1909. Serial No. 495,492.

*To all whom it may concern:*

Be it known that I, GUSTAV F. SCHULZE, a citizen of the United States, residing at Vandalia, in the county of Audrain and State of Missouri, have invented a new and useful Postman's Delivery-Wagon, of which the following is a specification.

This invention relates to a wagon or cart intended primarily for use by postmen delivering and collecting mail on rural free delivery routes, although the invention is not necessarily limited to this use.

The invention has for one of its objects to provide a comparatively simple and inexpensive vehicle of this character which is so designed as to carry the mail bags and packages in a manner to be conveniently accessible, and wherein the postman can readily and conveniently mount and dismount for the delivery and collection of mail.

Another object of the invention is the employment of a simple, novel and effective means for protecting the postman from the heat of the sun or from rain, snow and wind.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side view of the vehicle. Fig. 2 is a vertical longitudinal section thereof. Fig. 3 is a rear view. Fig. 4 is a horizontal section taken through the body part of the vehicle, on line 4—4, Fig. 2. Fig. 5 is a vertical section on line 5—5, Fig. 2. Fig. 6 is a detail view of a sun-shade attaching device. Fig. 7 is a side view of another form of the invention in which the seat box is hingedly mounted on the vehicle frame, the seat being shown in open position. Fig. 8 is a plan view with the top removed. Fig. 9 is a bottom plan view showing the lock for the seat box. Fig. 10 is a section on line 10—10, Fig. 9.

Similar reference characters are employed to designate corresponding parts throughout the views.

In the present instance, I have illustrated the invention as a two-wheel or sulky type of vehicle, but it is to be understood that any improved running gear may be employed.

Referring to the drawings, 1 designates an axle on which are mounted the road wheels 2, and connected with the axle are the thills 3 for attaching a draft animal to the vehicle. The body A of the vehicle is mounted directly over the axle and is attached to the thills by resilient brackets 4 secured to the bottom of the body and projecting upwardly therefrom with their forward ends connected at 5 to the thills adjacent the cross-bar 6 thereof that carries the swingletree 7. These brackets 4 support the front part of the body, and the rear part is mounted by brackets 4' on a leaf spring 8 secured under the seat portion of the body and having its ends attached to brackets 9 fastened to the depending portion of the thills and extending rearwardly therefrom. By this means, the body is supported on the thills at points in front and behind the axle.

The body A is a box-like structure divided into a central compartment 10 and side compartments 11, there being partition walls 12 between the compartments. The compartments 11 extend upwardly above the compartment 10, so that the top 13 of the latter forms a seat for the postman, the opposed walls of the compartments 11 being flaring at 14 to form the sides of the seat, there being a transverse plate 15, as shown in Fig. 2, constituting the back of the seat. The tops of the compartments 11 are provided with hinged covers 16, the hinges 17 of which are disposed at the sides of the body so that the covers or doors 16 can be swung outwardly over the wheels to thereby permit access to the mail in the compartments, and these doors are provided with handles or grips 18. The rear walls of the compartments 11 are formed into doors 19 provided with hinges 20 at their lower ends so that the doors can swing rearwardly and downwardly to permit of the ready placing of the mail matter in the compartments from the rear, so that the postman will not have to reach over the wheels and soil his clothes in placing the mail in the body. In each compartment 11 is a holder 21 in the form of a wire frame mounted to swing on a fixed rod 22, and this frame is formed with torsional springs coiled on the rods 22 in such a manner as to tension the frames to swing downwardly. The frames can be raised to permit the mail matter to be piled in the compartment, and after the piles are completed, the springs will engage the tops thereof and prevent the mail matter from being jolted about. Also arranged in the compartment 11 are removable holders 23 for receiving the mail collected along the route. The compartment 10 under the seat has a swinging door 24 at its front, the hinges 25 of which are located at the bottom of the door, so that the same will swing forwardly and downwardly, and this compartment may be used for storing money order blanks, postage stamps, envelops, cards, and the like, or may be used for any other suitable purpose. The doors 19 and 24 are provided with ordinary spring-actuated catches 26 for holding the doors in closed position, and so constructed as to be rain-proof.

In order to protect the postman from rain, snow, wind or the heat of the sun, a top designated generally by B is provided. This top comprises a pair of side standards 27 each having at its upper end a horizontal arm 28, which bars are connected together by bows 30 that form a skeleton-work for the hood or covering 31 of the vehicle top. The lower ends of the standard are set into socket pieces, eyes or the like 32, mounted on the side plates 33 rising from the platform 34 of the vehicle body. Supported from the framework formed by the standards 27, bars 28 and ribs 30, are side and rear curtains 35 and 36 fastened together at their meeting edges by buckle and strap devices 37, the lower ends of the curtains being fastened down by buttons 38 on the vehicle body engaging in buttonholes 39 in the curtains. Extending vertically across the vehicle top from one standard to the other is a shield 40 suitably fastened to the standards and so positioned as to protect the face of the postman, said shield having a large transparent plate 41 for affording free observation. The side and rear curtains are also provided with view openings 42 closed by celluloid or other transparent plates 43.

To protect the limbs of the postman from rain and snow, a tiltable apron C is provided, the same consisting of a horizontally-disposed bowed or U-shaped frame 44 and a vertically-disposed bowed or U-shaped frame 45 connected with the frame 44, the latter frame being adapted to rest on the footboard or dash 46 and also the side plates 33 when the apron is in normal position, as shown in full lines, Fig. 2. Arranged on the frames 44 and 45 is an oilcloth or other covering 47 which sheds the rain downwardly around the outside of the vehicle body. The frame 44 is pivotally connected with the vehicle body by hinges 49, and the extremities of the rod forming the frame 45 project below the apron and are adapted to enter sockets or brackets 50, Fig. 2, when the apron is in normal position. When the postman desires to dismount or enter the vehicle, the apron is tilted forwardly as shown by dotted lines, Fig. 2, to thereby afford ready ingress or egress.

When the vehicle top is not required, it can be readily removed simply by unfastening the curtains from the buttons and removing the standards from the socket pieces 32; and also, by detaching the hinges 49 and removing the frame 45 from the socket pieces 50, the apron can be removed.

In Fig. 6, an attachment is provided whereby an ordinary sun shade can be used in place of the top hereinbefore described. A socket bearing 51 is mounted on the vehicle body, and in this socket is mounted a ball 52 that carries the staff or handle clamp 53 for an umbrella 53', and the umbrella can be tilted or held in any position by a clamping screw 54.

In Figs. 7 to 10, inclusive, a construction is shown in which the seat box is hingedly mounted, so that it can be thrown rearwardly for permitting the postman to mount or dismount at the rear of the vehicle instead of at the side over the thills. For this purpose, the box A', which is similar in construction to that already described, is normally supported on the brackets 4' in coöperative relation with the platform box P. The top B and apron C are fastened to the platform box so that the seat box can be swung open and closed without the other parts moving therewith. One of the brackets 4' is formed with a bearing 55 for receiving a vertical pivot bolt 56 that passes through the bottom 57 of the seat box adjacent one end thereof, so that the latter can swing backwardly, as shown in Figs. 7 and 8, to permit the postman to mount and dismount between the box and adjacent wheel of the vehicle. In order to hold the box in normal position, a latch 58 is pivoted at 59 to the bottom of the seat box, and this latch has a dog 60 which engages in a notch 61 on the other supporting bracket 4', the latch being held in locking position by a leaf spring 62 pressing against the same. The latch extends forwardly beyond the box to form a foot piece 63 which can be engaged by the foot of the driver when the latch is to be released to permit the box to be thrown to open position. The latch can also be released from the outside by having a rearward extension 64 forming a grip. When the seat box is in normal position, the latch is engaged, as shown in Fig. 9, and upon releasing the latch by the foot, as when the driver is in the vehicle, or by hand when the driver is outside the vehicle and wishes to mount, the seat box can be thrown open to permit the driver to dismount or mount. On the pivot bolt 57 is a spring 65 which serves to prevent rattling by holding the box tightly against its supporting bracket.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. A postman's delivery wagon comprising an axle, thills connected therewith, wheels on the axle, and a body supported on the axle and thills, said body comprising a box-like structure, partitions dividing the structure into separate end and intermediate compartments arranged side by side, the end compartments being open at the top and back, and the intermediate compartment being open at the front, and doors for the openings of the compartments, the top of the said structure being formed to provide a seat disposed between and below the top doors of the end compartments.

2. A postman's delivery vehicle comprising a wheel-supported body, a seat on the body, compartments at opposite sides of the seat, top doors at opposite sides of the seat for the compartments, and a door for the rear of each compartment, the rear doors being arranged side by side and mounted to independently swing rearwardly and downwardly to open position.

3. A postman's delivery wagon comprising a wheel-supported body, a seat on the top of the body, partitions in the body for dividing the same into central and end compartments, the end compartments extending upwardly above the central compartment to form sides for the seat, a front door for the central compartment, said end compartments being open both at the top and rear, and a pair of doors for each end compartment, one for the top and the other for the rear thereof.

4. A postman's delivery vehicle comprising a wheel-supported body, said body being in the form of a box, partitions dividing the body into central and end compartments, a seat on the central compartment, the end compartments projecting upwardly above the central compartment to form the sides of the seat, a plate forming the rear of the seat, upwardly and outwardly swinging doors for the end compartments, rearwardly and downwardly swinging doors for the rear sides of the end compartments, a forwardly and downwardly swinging door for the front of the central compartment, and means for holding the doors in closed position.

5. A postman's delivery vehicle comprising an axle, wheels on the axle, a body disposed over the axle, thills having their ends secured to the axle, resilient brackets secured to the under side of the body and extending forward therefrom and having their front ends secured to the thills, brackets on the thills extending rearwardly therefrom beyond the axle, a spring connecting the last-mentioned brackets and secured to the body, and a top for the vehicle.

6. A postman's delivery vehicle comprising a wheel-supported body, a compartment seat box mounted on the body to swing rearwardly for permitting the postman to mount or dismount from the rear, and a top mounted wholly on the body and including curtains adapted to be detachably connected with the seat box to permit the latter to be moved rearwardly.

7. A postman's delivery vehicle comprising a wheel-supported body, a compartment-containing seat box, means for mounting the box on the body to swing rearwardly for permitting the postman to mount or dismount from the rear, and a top comprising side standards mounted on the body forwardly of the box and including side and rear curtains detachably connected with the box to permit the latter to be moved rearwardly.

8. In a delivery vehicle, the combination of a wheel-supported body, a top for the body including supports mounted thereon, and a seat box mounted on the body independently of the top to swing rearwardly to permit the occupant to mount or dismount at the rear.

9. In a delivery vehicle, the combination of a wheel-supported body, a top for the body including supports mounted thereon, a seat box mounted on the body at a point rearward of the supports to swing rearwardly to permit the occupant to mount or dismount at the rear, and a latch for holding the box in normal position.

10. In a delivery vehicle, the combination of a wheel-supported body, a driver's seat pivotally mounted thereon, a locking device for holding the seat in normal position, said locking device comprising a spring-pressed member movable in a horizontal plane under the seat and projecting beyond the same to form a grip for manipulating the latch.

11. A postman's delivery vehicle comprising a wheel-supported body, a seat box mounted thereon, and a cover supported on the body independently of the seat box and including standards secured at the lower ends to opposite sides of the body in advance of the seat box, a top frame carried by the upper ends of the standards and including a cover, and side and rear curtains detachably connected at their lower edges to the sides and rear of the seat box.

12. In a vehicle, the combination of an axle, thills connected therewith, a body-supporting frame resiliently supported on the axle and thills, brackets on the frame, a box seat mounted on the brackets and including compartments, means for pivotally connecting the seat to one of the brackets, and a spring-pressed latch on the seat normally engaging the other bracket, said latch being disposed under the box and projecting forwardly and rearwardly therefrom to form a foot piece on the front extremity and a grip on the rear extremity of the latch.

13. In a vehicle of the class described, the combination of an axle, wheels thereon, thills connected with the axle and including a cross bar, a body mounted over the axle and free therefrom, resilient brackets secured to the body and extending forwardly therefrom and secured to the cross bar of the thills, and means for resiliently supporting the rear portion of the body on the thills independently of the said resilient brackets.

14. In a vehicle of the class described, the combination of an axle, wheels thereon, thills connected with the axle, a body disposed over the axle and free therefrom, brackets extending rearwardly from the thills under the body and beyond the axle, an elliptical spring connected with the rear portion of the body and with the rear ends of said brackets, and means for resiliently supporting the front portion of the body on the thills whereby the body is yieldingly connected with the thills in front and in rear of the axle.

15. A postman's delivery wagon comprising an axle, wheels thereon, thills connected with the axle, and a body mounted on the axle and thills, said body comprising a platform and a box-like seat structure movable rearwardly and laterally from the platform, said structure including a plurality of partitions dividing the same into separate end and intermediate compartments and arranged side by side, the end compartments being open at the top and back, and the intermediate compartment being open at the front, doors for the openings of the compartments, the top of the said structure being formed to provide a seat.

In testimony, that I claim the foregoing as my own, I have hereto affixed my signature in the presence of two witnesses.

GUSTAV F. SCHULZE.

Witnesses:
 ARCH. L. MOTLEY,
 WILL DANIEL.